United States Patent
Allain et al.

(10) Patent No.: US 9,294,485 B2
(45) Date of Patent: Mar. 22, 2016

(54) CONTROLLING ACCESS TO SHARED CONTENT IN AN ONLINE CONTENT MANAGEMENT SYSTEM

(71) Applicant: Dropbox, Inc., San Francisco, CA (US)

(72) Inventors: Francois Alexander Allain, San Francisco, CA (US); Anand Subramani, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 103 days.

(21) Appl. No.: 14/165,013

(22) Filed: Jan. 27, 2014

(65) Prior Publication Data

US 2014/0215551 A1    Jul. 31, 2014

Related U.S. Application Data

(60) Provisional application No. 61/757,193, filed on Jan. 27, 2013.

(51) Int. Cl.
H04L 29/06    (2006.01)
(52) U.S. Cl.
CPC .............. *H04L 63/104* (2013.01); *H04L 63/10* (2013.01)
(58) Field of Classification Search
None
See application file for complete search history.

(56) References Cited

U.S. PATENT DOCUMENTS

| | | | |
|---|---|---|---|
| 2006/0265599 A1* | 11/2006 | Kanai | 713/182 |
| 2007/0073673 A1* | 3/2007 | McVeigh et al. | 707/4 |
| 2007/0100701 A1* | 5/2007 | Boccon-Gibod et al. | 705/21 |
| 2008/0147821 A1* | 6/2008 | Dietrich et al. | 709/216 |
| 2011/0265150 A1* | 10/2011 | Spooner et al. | 726/4 |
| 2012/0174181 A1* | 7/2012 | Zhang et al. | 726/1 |
| 2013/0124856 A1* | 5/2013 | Agrawal et al. | 713/156 |

OTHER PUBLICATIONS

HowTo: Groups as Roles tutorial—Drupal 5.x, Drupal, 2007.*

* cited by examiner

*Primary Examiner* — Minh Dinh
(74) *Attorney, Agent, or Firm* — Novak Druce Connolly Bove + Quigg LLP

(57) ABSTRACT

Systems and methods for controlling access to shared content in an online content management system, include receiving a request to access a content item from a requester, wherein the content item is stored in a synchronized online content management system. The example method then includes determining that the requester is in an approved list of requestors and granting access to the content item. In one variation, the request to access the content item includes activation of a shared link. In another variation, the request to access the content item includes access to a shared folder in the synchronized online content management system. In a third variation, determining that the requester is in an approved list of requesters includes determining that the requester is logged into a primary and secondary account, and that the requester is in an approved list for the secondary account.

20 Claims, 7 Drawing Sheets

| USER ID | TEAM ID |
|---------|---------|
| 1 | 1 |
| 2 | 1 |
| 3 | 1 |
| 4 | 1 |
| 5 | 2 |
| 6 | 2 |
| 7 | 2 |

FIG. 3

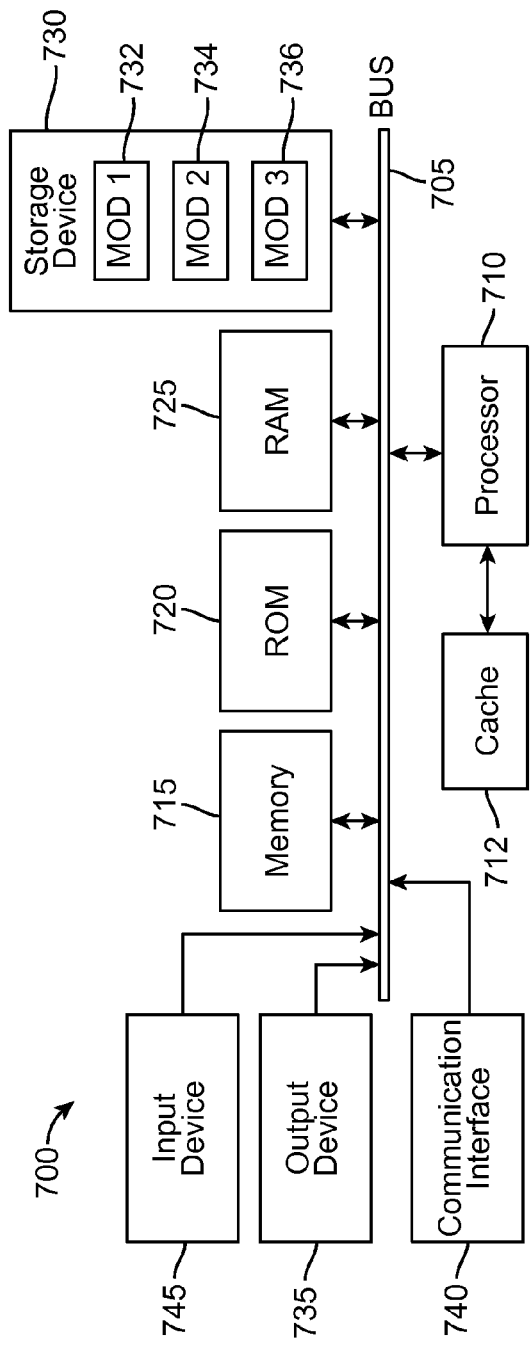
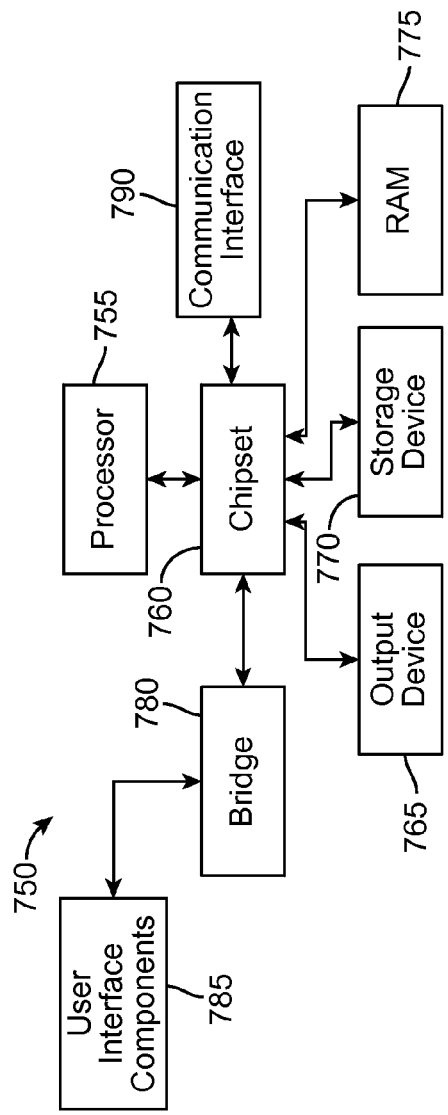

CONTROLLING ACCESS TO SHARED CONTENT IN AN ONLINE CONTENT MANAGEMENT SYSTEM

CROSS-REFERENCE TO RELATED APPLICATION

The present application claims the benefit of Provisional Application No. 61/757,193 filed Jan. 27, 2013. Said application is expressly incorporated herein by reference in its entirety.

TECHNICAL FIELD

The present technology pertains to online content management systems and more specifically pertains to controlling access to shared content in a content management system.

BACKGROUND

Online content management systems allow a user to upload content to such a system and access the uploaded content from any device. One advantage of such a system is that once the content is uploaded, the content is stored in a cloud server and thus is not subject to being lost in the event of failure of any individual device memory or storage mechanism. Another advantage of such a system is that a user can quickly and easily share large files with multiple other users. For example, a user can upload a large content item such as a high-resolution video to the content management system. Once the video is uploaded the user can give a second user read-write access to the content item by granting the second user shared folder access. Similarly, the user can give read-only access to the content item by sending a third user a network address associated with the content item. In this case, the third user does not even need to be a member of the content management system to access the content item.

Groups such as businesses, universities, and schools can utilize an account for a content management system to allow members of the group to upload, share, and collaborate on uploaded content items. However, in such systems there exists the possibility that a member of the group might inadvertently or otherwise share sensitive confidential data with external unauthorized users. Thus a need exists for enabling an administrator of a group account to limit sharing of content outside of the group and to provide more control for how group members share content.

SUMMARY

Disclosed are systems, methods, and non-transitory computer-readable storage media for controlling access to shared content in an online content management system. An example method includes receiving a request to access a content item from a requestor, wherein the content item is stored in a synchronized online content management system. The example method then includes determining that the requestor is in an approved list of requestors and granting access to the content item. In one variation of the example method, the request to access the content item includes activation of a shared link. In another variation of the example method, the request to access the content item includes access to a shared folder in the synchronized online content management system.

In a third variation of the example method, determining that the requestor is in an approved list of requestors includes determining that the requestor is logged into a primary and secondary account, and that the requestor is in an approved list for the secondary account. In a fourth variation of the example method, the method includes prompting the user to login to the secondary account.

A second example method allows an administrator of a group account to control types of shared links that each user in the group can create. The second example method includes, receiving a request from a requestor to perform a predefined action, wherein the predefined action is sharing a link to a folder or sharing access to a folder in a synchronized online content management system. The second example method includes determining that the requestor is in a predefined group and determining a setting for the predefined group, wherein the setting is always public, always private, or allowing the requestor to specify public or private. The second example method then includes performing the predefined action according to the setting.

In a first variation, the second example method can include receiving a list of recipients to perform the predefined action with and displaying users to which the first action can be performed in a first configuration and displaying users to which the first action cannot be performed in a second configuration.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 shows an example database for storing and looking up user ID and team IDs;

FIG. 7_A shows a conventional system bus computing system architecture which can be used to implement the invention; and FIG. 7_B shows a computer system having a chipset architecture which can be used to implement the invention.

DETAILED DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The disclosed technology addresses the need in the art for enabling an administrator of a group account of an online content management system to limit sharing of content outside of the group and to provide more control for how group members share content. An example method includes receiving a request to access a content item from a requestor, wherein the content item is stored in a synchronized online content management system. The example method then includes determining that the requestor is in an approved list of requestors and granting access to the content item. In one variation of the example method, the request to access the content item includes activation of a shared link. In another variation of the example method, the request to access the content item includes access to a shared folder in the synchronized online content management system.

In a third variation of the example method, determining that the requestor is in an approved list of requestors includes determining that the requestor is logged into a primary and secondary account, and that the requestor is in an approved list for the secondary account. In a fourth variation of the example method, the method includes prompting the user to login to the secondary account.

A second example method allows an administrator of a group account to control types of shared links that each user in the group can create. The second example method includes receiving a request from a requestor to perform a predefined action, wherein the predefined action is sharing a link to a folder or sharing access to a folder in a synchronized online content management system. The second example method includes determining that the requestor is in a predefined group and determining a setting for the predefined group, wherein the setting is always public, always private, or allowing the requestor to specify public or private. The second example method then includes performing the predefined action according to the setting.

In a first variation, the second example method can include receiving a list of recipients to perform the predefined action with and displaying users to which the first action can be performed in a first configuration and displaying users to which the first action cannot be performed in a second configuration.

Figure 1:
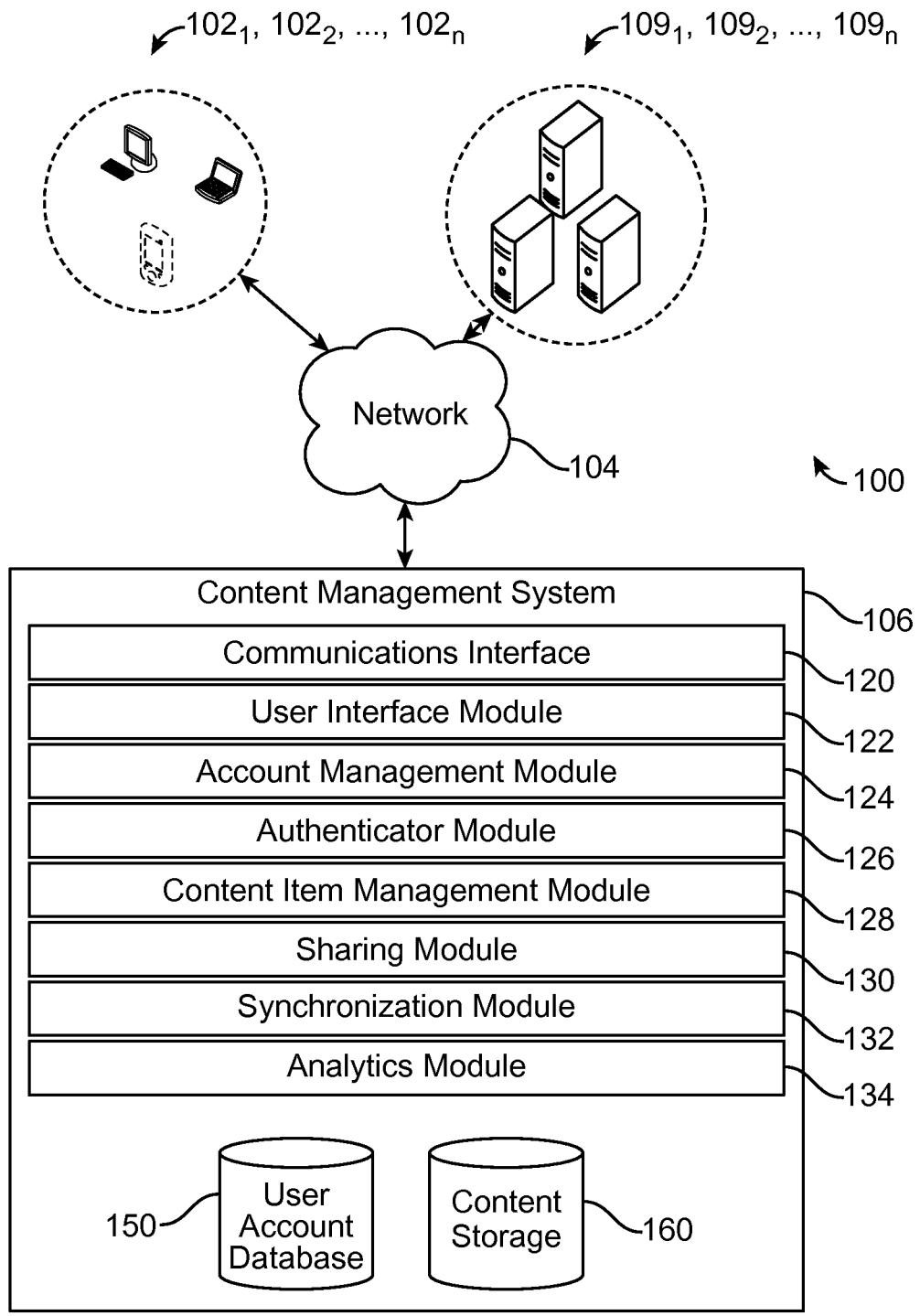
FIG. 1 shows an exemplary configuration of devices and a network in accordance with one aspect of the invention.

An exemplary system configuration 100 is shown in FIG. 1, wherein electronic devices communicate via a network for purposes of exchanging content and other data. System 100 can be configured for use on a wide area network such as that illustrated in FIG. 1. However, the present principles are applicable to a wide variety of network configurations that facilitate the intercommunication of electronic devices, such as a local area network, wireless network, etc. For example, each of the components of system 100 in FIG. 1 can be implemented in a localized or distributed fashion in a network.

In system 100, a user can interact with content management system 106 through any one of a variety of client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to interact with the content management system through multiple client devices 102. For example, a user may upload content to content management system 106 using client device $102_i$ via network 104. The user can later retrieve the uploaded content from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network attached storage (NAS) device, in a storage area network (SAN), in a redundant array of independent disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can include a content management module 128 for maintaining a content directory. The content directory can identify the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2:
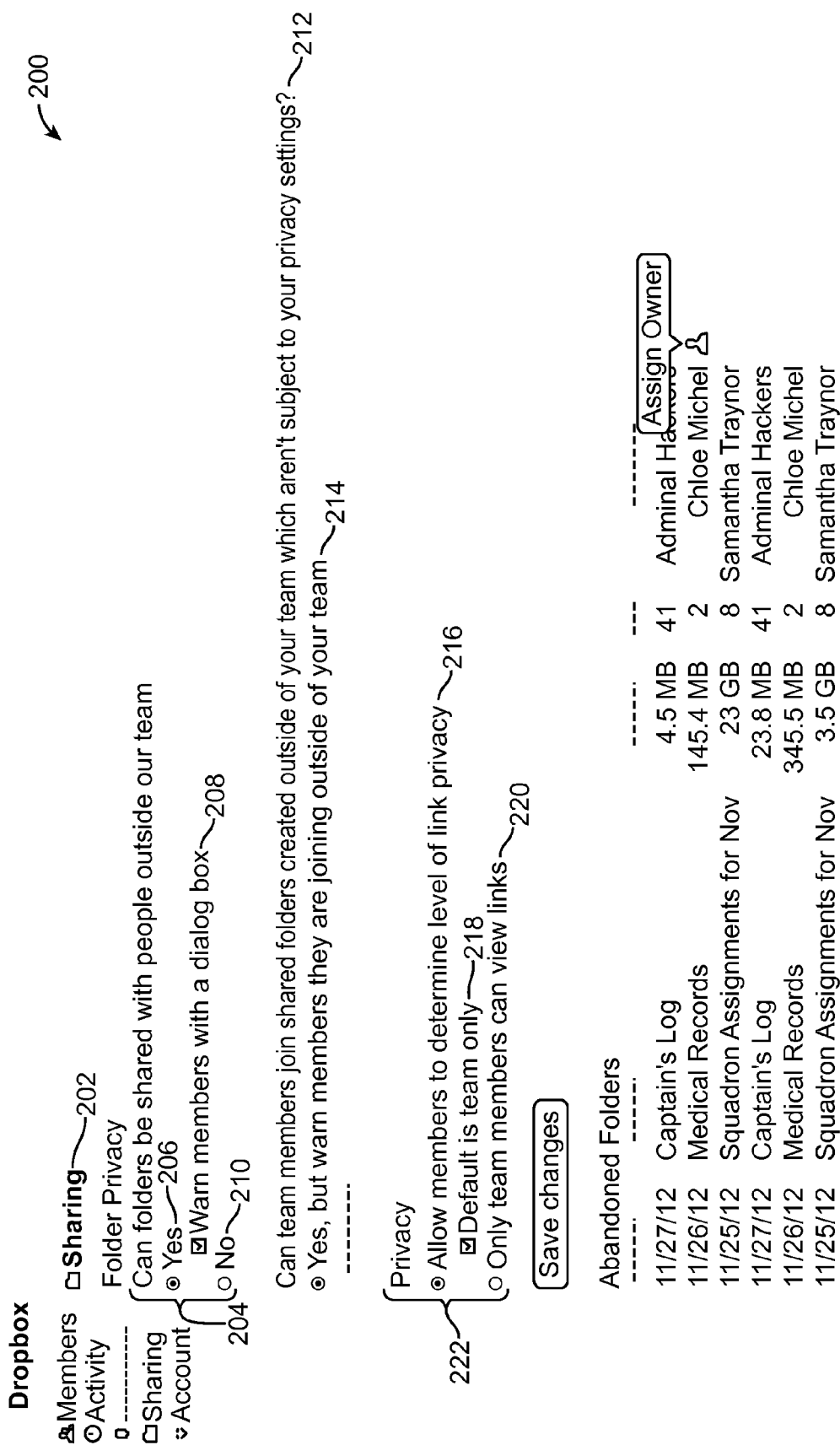
FIG. 2 shows an example graphical user interface to allow an administrator of a group account on a content management system to manage sharing permissions for members of the group.

FIG. 2 shows example graphical user interface 200 to enable an administrator of a group account on a content management system to manage sharing permissions for members of the group. Graphical user interface 200 includes Sharing Icon 202. Under Sharing Icon 202, Folder Privacy Settings 204 and Link Privacy Settings 222 are provided.

Folder Privacy Settings 204 enable an administrator to generally allow folders in the group account to be shared with users outside of the group. The administrator for example can check a "Yes" setting 206, which will permit content in the group account to be shared with external users. The administrator may require that a warning message be provided to a group member when content is designated by the member to be shared with an external user, such as by checking a "warning" setting 208. Conversely, the administrator may generally prohibit folders in the group account from being shared with external users, for example by checking a "No" setting 210 in the Folder Privacy Settings 204.

Link Privacy Settings 222 enables an administrator to determine how group members are permitted to specify privacy settings for links to specific content folders. Setting 216 permits each member of a group to select a level of privacy for a specific link to content, such as public or private (i.e. limited to group members only). Setting 218 sets a default user selection as group members only, but allows members to change the privacy of the link to public. Setting 220 allows members of the group to only view a shared link, thus making each shared link private.

Figure 3:
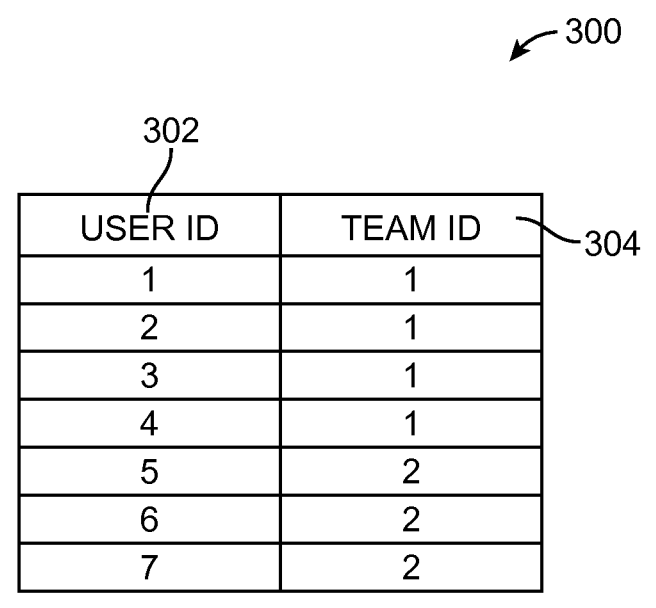

FIG. 3 shows example database 300 for storing and looking up user IDs 302 and team IDs 305. As shown, database 300, in response to a query, can return whether a UserID is present and can return an indication of the team or group of which a UserID is a member. Database 300 can be any database capable of returning data in response to a query, such as a SQL structured database. One of ordinary skill in the art will recognize that other databases can be utilized as well. As shown in example database 300, a first group (1) has four members with unique UserID values (1, 2, 3 and 4) and a second group (2) has three members with unique UserID values (5, 6 and 7). According to one aspect of the invention, the system determines whether a requester is registered with the content management system (i.e. is logged-in to a first account) and then further determines whether the requester is a member of a shared group (i.e. is logged-in to a secondary account).

Figure 4:
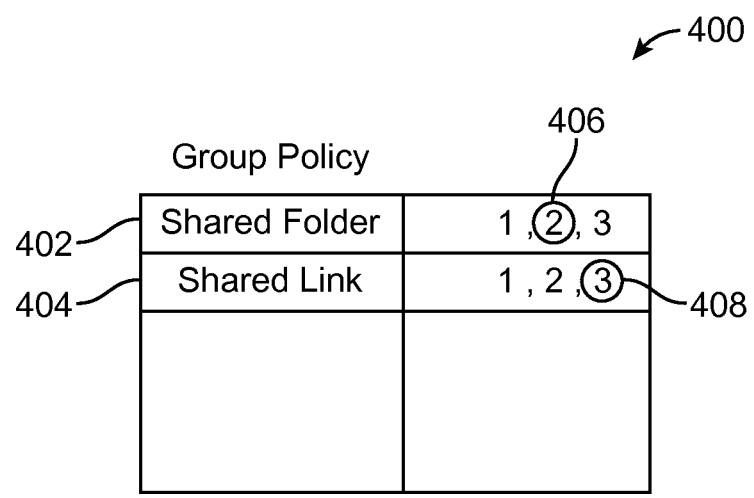
FIG. 4 shows an example database for storing and looking up stored group policies for various sharing functions in the content management system.

FIG. 4 shows example database 400 for storing and looking up stored group policies for various sharing functions in the content management system. Example database 400 includes Shared Folder functions 402, with three options 406 shown. As shown, an administrator has selected a second option from options 406. In one example, options 406 correspond to options 206, 208 and 210 in Folder Privacy Settings 204 described above with respect to FIG. 2.

Example database 400 also includes Shared Link functions 404, with three options 408 shown. As shown, an administrator has selected a third option from options 408. In one example, options 408 correspond to options 216, 218 and 220 in Link Privacy Settings 222 described above in FIG. 2. Database 400 can be any database capable of returning data in response to a query, such as a SQL structured database. One of ordinary skill in the art will recognize that other databases can be utilized as well.

Figure 5:
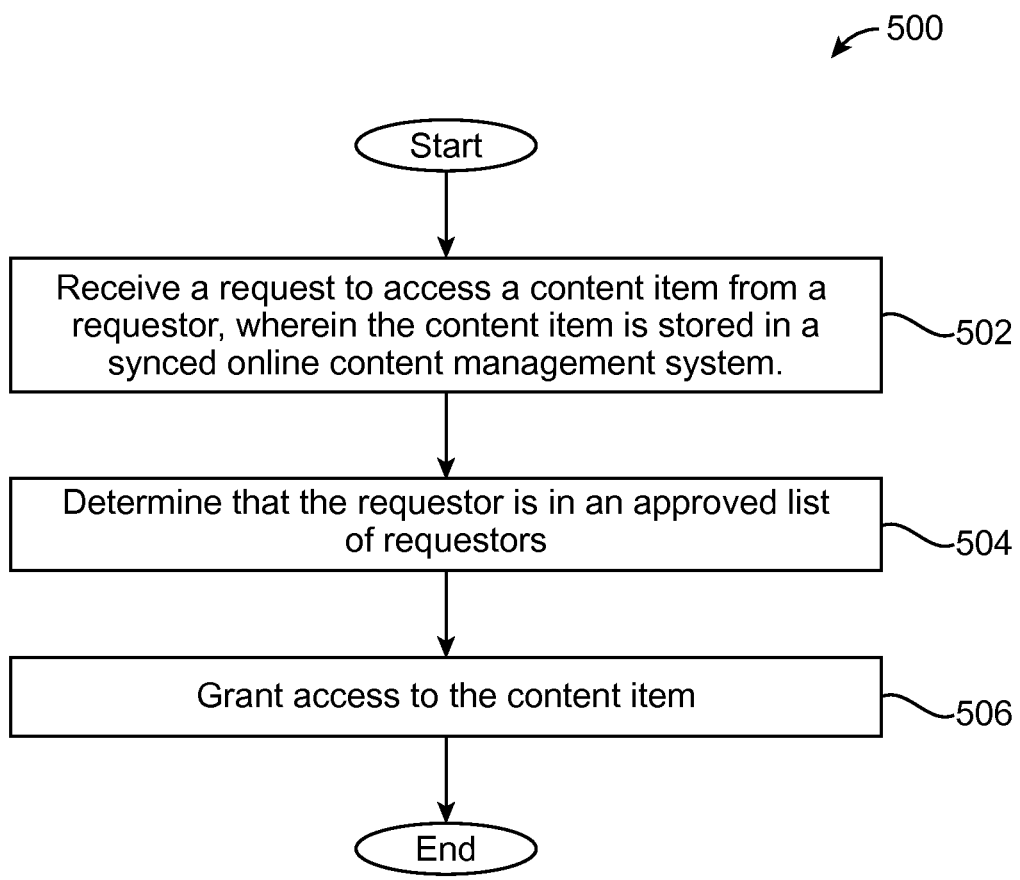
FIG. 5 shows an example method for permitting access to a shared link.

FIG. 5 shows method 500 for permitting access to a shared link, in the form of a process flow. At step 502, a request is received from a requester to access a content item that is stored in a synchronized online content management system. At step 504, it is determined that the requester's ID is in an approved list of requesters, and then step 506 is executed granting access to the content item. This determination can include querying a structured database such as the one shown in FIG. 3 or FIG. 4.

In one variation of the method 500, the request to access the content item includes activation of a shared link. In another variation of method 500, the request to access the content item includes access to a shared folder in the synchronized online content management system.

In a third variation of method 500, determining that the requestor is in an approved list of requestors includes determining that the requestor is logged into a primary and secondary account, and that the requestor is in an approved list for the secondary account. In a fourth variation of the method 500, the method includes prompting the user to login to the secondary account. In one example, this feature can utilize single sign-on (SSO) technology that allows a user to sign into a personal and work account simultaneously and switch between the two accounts.

Figure 6:
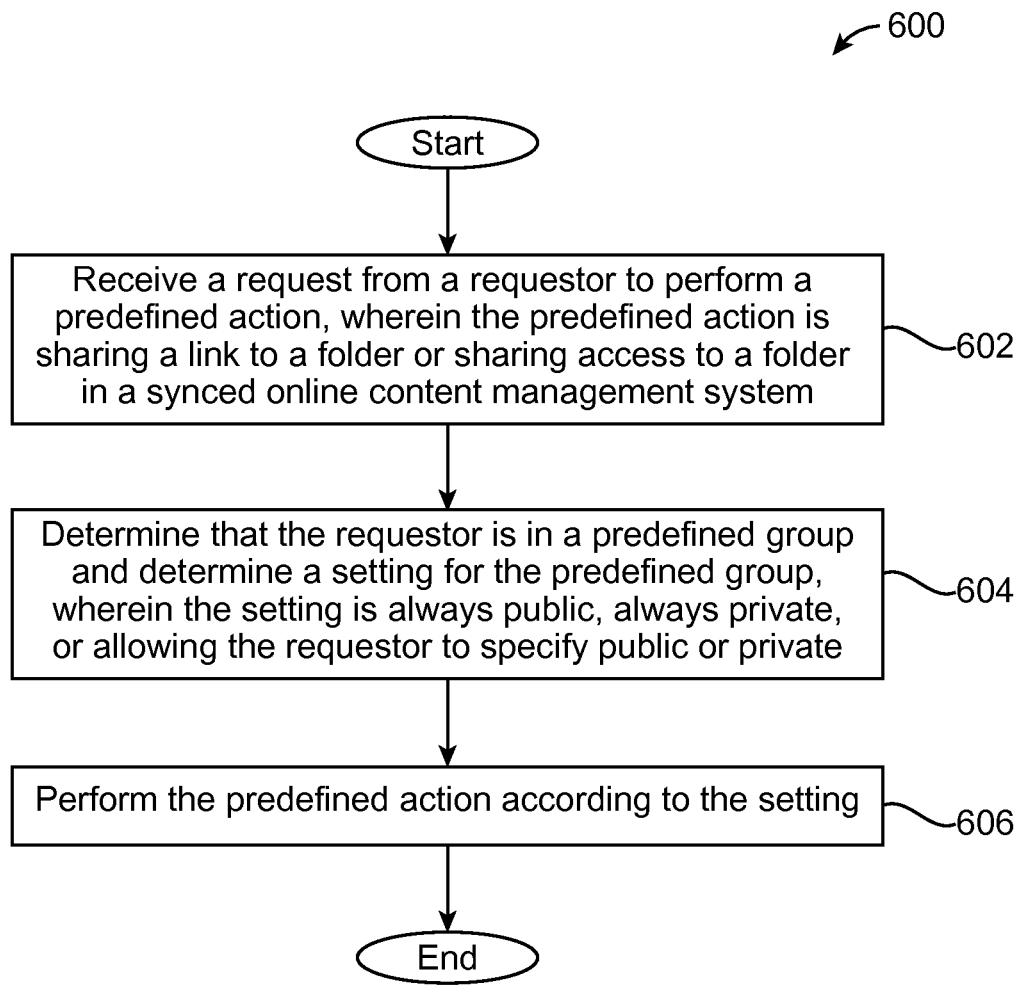
FIG. 6 shows an example method for allowing an administrator of a group account to control types of shared links that each user in the group can create.

FIG. 6 shows method 600 for allowing an administrator of a group account to control types of shared links that each user in the group can create. Method 600 begins at step 602 and includes, receiving a request from a requester to perform a predefined action, wherein the predefined action is sharing a link to a folder or sharing access to a folder in a synchronized online content management system. Method 600 then proceeds to step 604 and includes determining that the requester's ID is in a predefined group and determining a setting for the content folders in the predefined group, wherein the setting is always public, always private, or allowing the requester to specify public or private. Method 600 then proceeds to step 606 and includes performing the predefined action according to the retrieved setting.

In a first variation, method 600 can include receiving a list of recipients to perform the predefined action with and displaying users to which the first action can be performed in a first configuration and displaying users to which the first action cannot be performed in a second configuration. In one example, if a requester specifies public, names within a same group are identified with a first color such as green and names not within the group are identified with a second color such as red to warn the requestor of links being sent to names not within the group. Similarly, if the requester specifies private, names within the same group are identified with a first color such as green and names not within the group are identified with a second color such as red to show the requestor link recipients that will be sent and link recipients that will be blocked by current settings. These examples are merely illustrative and one of ordinary skill in the art will recognize that other indicators can be used in various circumstances.

FIG. 7A, and FIG. 7B show exemplary possible system embodiments. The more appropriate embodiment will be apparent to those of ordinary skill in the art when practicing the present technology. Persons of ordinary skill in the art will also readily appreciate that other system embodiments are possible.

FIG. 7A shows a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B shows a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A computer-implemented method for controlling access to shared group content in a networked content management system, comprising:
    maintaining a database of authorized users identifying groups to which said users are members;
    maintaining a database of group sharing policies identifying sharing permissions for stored group content;
    determining, in response to a request to share access to particular stored group content, whether the request is from an authorized user by consulting said authorized user database;
    determining the sharing permissions applicable to the requested particular stored group content by consulting said group sharing policy database, wherein the sharing permissions include a determination of whether a response to a request to share content in a group content folder permitted to be shared with non-group members should contain a warning that the content is about to be shared with a non-group member; and
    processing the request in accordance with the results of said determinations.

2. The computer-implemented method of claim 1, wherein the request includes activation of a shared link.

3. The computer-implemented method of claim 1, wherein the request to share access comprises a request to share a link to a folder in said networked content management system.

4. The computer-implemented method of claim 1, wherein the request to share access comprises a request to share access to a folder in said networked content management system.

5. The computer-implemented method of claim 1, wherein the sharing permissions include an identification of whether a group content folder is permitted to be shared with non-group members.

6. The computer-implemented method of claim 5, wherein processing of the request includes prohibiting a group member from sharing access to particular stored group content that has been identified as private to the group.

7. The computer-implemented method of claim 1, wherein the sharing permissions include an identification of whether a requesting group member has specified a privacy setting for a link to a specific group content folder requested to be shared with non-group members.

8. The computer-implemented method of claim 7, wherein processing of the request includes prohibiting a group member from sharing a link to particular stored group content that has been specified in a privacy setting as private to the group.

9. A computer-implemented method for controlling access to shared group content in a networked content management system, comprising:
    maintaining a database of authorized users identifying groups to which said users are members;

maintaining a database of group sharing policies identifying sharing permissions for stored group content;

determining, in response to a request to share access to particular stored group content, whether the request is from an authorized user by consulting said authorized user database;

determining the sharing permissions applicable to the requested particular stored group content by consulting said group sharing policy database wherein the sharing permissions include an identification of whether a privacy setting for a link to a specific group content folder requested to be shared with non-group members has been set to view only; and processing the request in accordance with the results of said determinations.

10. The computer-implemented method of claim 9, wherein processing of the request includes prohibiting a group member from sharing a link to particular stored group content that has been specified in a privacy setting as view only.

11. A system for controlling access to shared group content in a networked content management system, comprising:

a database of authorized users identifying groups to which said users are members;

a database of group sharing policies identifying sharing permissions for stored group content;

at least one processor configured to:

determine, in response to a request to share access to particular stored group content, whether the request is from an authorized user by consulting said authorized user database;

determine the sharing permissions applicable to the requested particular stored group content by consulting said group sharing policy database, wherein the sharing permissions include a determination of whether a response to a request to share content in a group content folder permitted to be shared with non-group members should contain a warning that the content is about to be shared with a non-group member; and process the request in accordance with the results of said determinations.

12. The system of claim 11, wherein the request includes activation of a shared link.

13. The system of claim 11, wherein the request to share access comprises a request to share a link to a folder in said networked content management system.

14. The system of claim 11, wherein the request to share access comprises a request to share access to a folder in said networked content management system.

15. The system of claim 11, wherein the sharing permissions include an identification of whether a group content folder is permitted to be shared with non-group members.

16. The system of claim 15, wherein processing of the request includes prohibiting a group member from sharing access to particular stored group content that has been identified as private to the group.

17. The system of claim 11, wherein the sharing permissions include an identification of whether a requesting group member has specified a privacy setting for a link to a specific group content folder requested to be shared with non-group members.

18. The system of claim 17, wherein processing of the request includes prohibiting a group member from sharing a link to particular stored group content that has been specified in a privacy setting as private to the group.

19. A system for controlling access to shared group content in a networked content management system, comprising:

a database of authorized users identifying groups to which said users are members;

a database of group sharing policies identifying sharing permissions for stored group content;

at least one processor configured to:

determine, in response to a request to share access to particular stored group content, whether the request is from an authorized user by consulting said authorized user database;

determine the sharing permissions applicable to the requested particular stored group content by consulting said group sharing policy database, wherein the sharing permissions include an identification of whether a privacy setting for a link to a specific group content folder requested to be shared with non-group members has been set to view only; and process the request in accordance with the results of said determinations.

20. The system of claim 19, wherein processing of the request includes prohibiting a group member from sharing a link to particular stored group content that has been specified in a privacy setting as view only.

* * * * *